United States Patent [19]

Leemkuil

[11] Patent Number: 4,792,034
[45] Date of Patent: Dec. 20, 1988

[54] TWISTED FLAT BELT DRIVE FOR LINE SHAFT CONVEYORS

[75] Inventor: Hendrik Leemkuil, Pickerington, Ohio

[73] Assignee: Versa Corporation, Mount Sterling, Ohio

[21] Appl. No.: 47,906

[22] Filed: May 7, 1987

Related U.S. Application Data

[63] Continuation-in-part of Ser. No. 769,421, Aug. 26, 1985, abandoned.

[51] Int. Cl.[4] ............................................. B65G 47/46
[52] U.S. Cl. ...................................... 198/372; 474/62
[58] Field of Search ............... 198/367, 372, 436, 437, 198/782, 790, 787; 474/61–63

[56] References Cited

U.S. PATENT DOCUMENTS

| | | | |
|---|---|---|---|
| Re. 25,673 | 11/1964 | Burt . | |
| 148,353 | 3/1874 | Curtis .................................. | 474/63 |
| 984,708 | 2/1911 | Rice .................................... | 474/63 |
| 2,613,790 | 10/1952 | Schottelkotte . | |
| 2,985,274 | 5/1961 | Byrnes et al. . | |
| 2,988,196 | 6/1961 | Byrnes et al. . | |
| 3,018,873 | 1/1962 | Burt . | |
| 3,058,565 | 10/1962 | Byrnes . | |
| 3,058,567 | 10/1962 | Byrnes et al. . | |
| 3,138,238 | 6/1964 | DeGood et al. . | |
| 3,219,166 | 11/1965 | Collins et al. . | |
| 3,241,651 | 3/1966 | Colby . | |
| 3,254,752 | 6/1966 | Bauch et al. . | |
| 3,279,583 | 10/1966 | Abegglen . | |
| 3,334,723 | 8/1967 | Reed et al. . | |
| 3,370,685 | 2/1968 | Guilie . | |
| 3,429,417 | 2/1969 | DeGood et al. . | |
| 3,512,638 | 5/1970 | Chengges et al. . | |
| 3,650,375 | 3/1972 | Fleischauer et al. . | |
| 3,696,912 | 10/1972 | Fleischauer et al. . | |
| 3,747,736 | 7/1973 | Kornylak . | |
| 3,840,110 | 10/1974 | Molt et al. . | |
| 3,951,255 | 4/1976 | Shuttleworth et al. . | |
| 3,961,700 | 6/1976 | Fleischauer . | |
| 3,983,988 | 10/1976 | Maxted et al. . | |
| 4,111,087 | 9/1978 | Pankratz et al. . | |
| 4,164,998 | 8/1979 | DeGood et al. . | |
| 4,173,274 | 11/1979 | Kantarian et al. . | |
| 4,196,312 | 4/1980 | DeGood et al. . | |
| 4,264,002 | 4/1981 | Van Der Schie . | |
| 4,328,889 | 5/1982 | Maxted . | |
| 4,362,238 | 12/1982 | Rivette . | |
| 4,372,442 | 2/1983 | Fleischauer . | |
| 4,565,283 | 1/1986 | Greenlee, III . | |
| 4,598,815 | 7/1986 | Adama . | |
| 4,642,071 | 2/1987 | Botton . | |

Primary Examiner—Joseph E. Valenza
Attorney, Agent, or Firm—Litman, McMahon & Brown

[57] ABSTRACT

A twisted flat belt drive arrangement transfers rotation between nonparallel shafts. A toothed pulley or gear is affixed to each shaft, and a pair of smooth surfaced idler rollers are mounted to rotate independently on an idler shaft positioned between the two shafts. An endless, flat, toothed belt has end loops meshed with the gears and middle portions twisted to contact a smooth outer surface of the belt with the idler rollers. The twisted flat belt drive arrangement is applied to transferring rotation from a main conveyor line shaft to a line shaft of a branch conveyor intersecting the main conveyor. The arrangement is also applied to providing driving rotation to diverter rollers of a diverter mechanism through an intermediate transmission shaft parallel to the main line shaft. The drive arrangement may be implemented for both purposes on the same conveyor to power diverter rollers of a mechanism which diverts articles onto a branch conveyor which is also powered from the main conveyor line shaft.

26 Claims, 3 Drawing Sheets

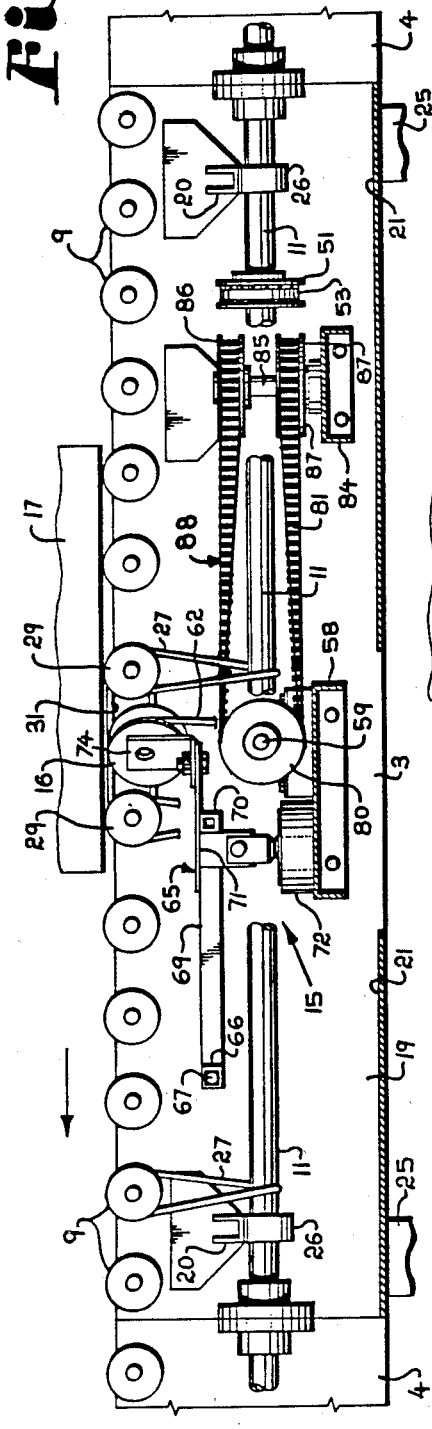
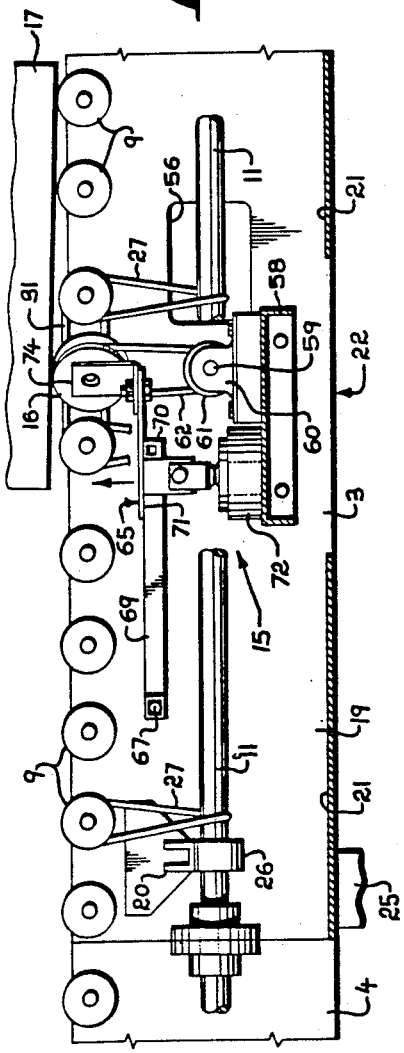
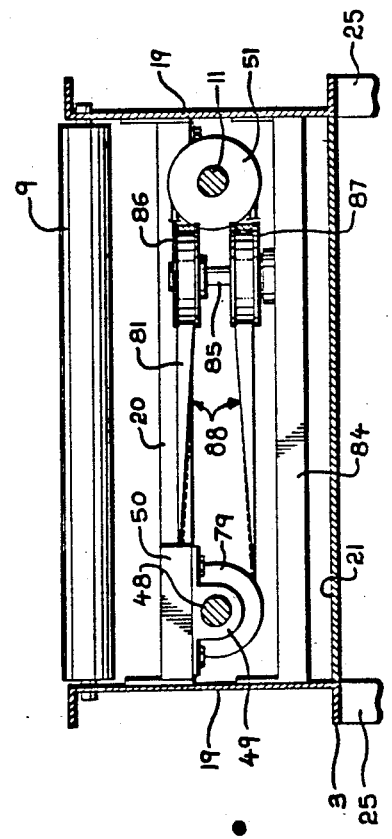

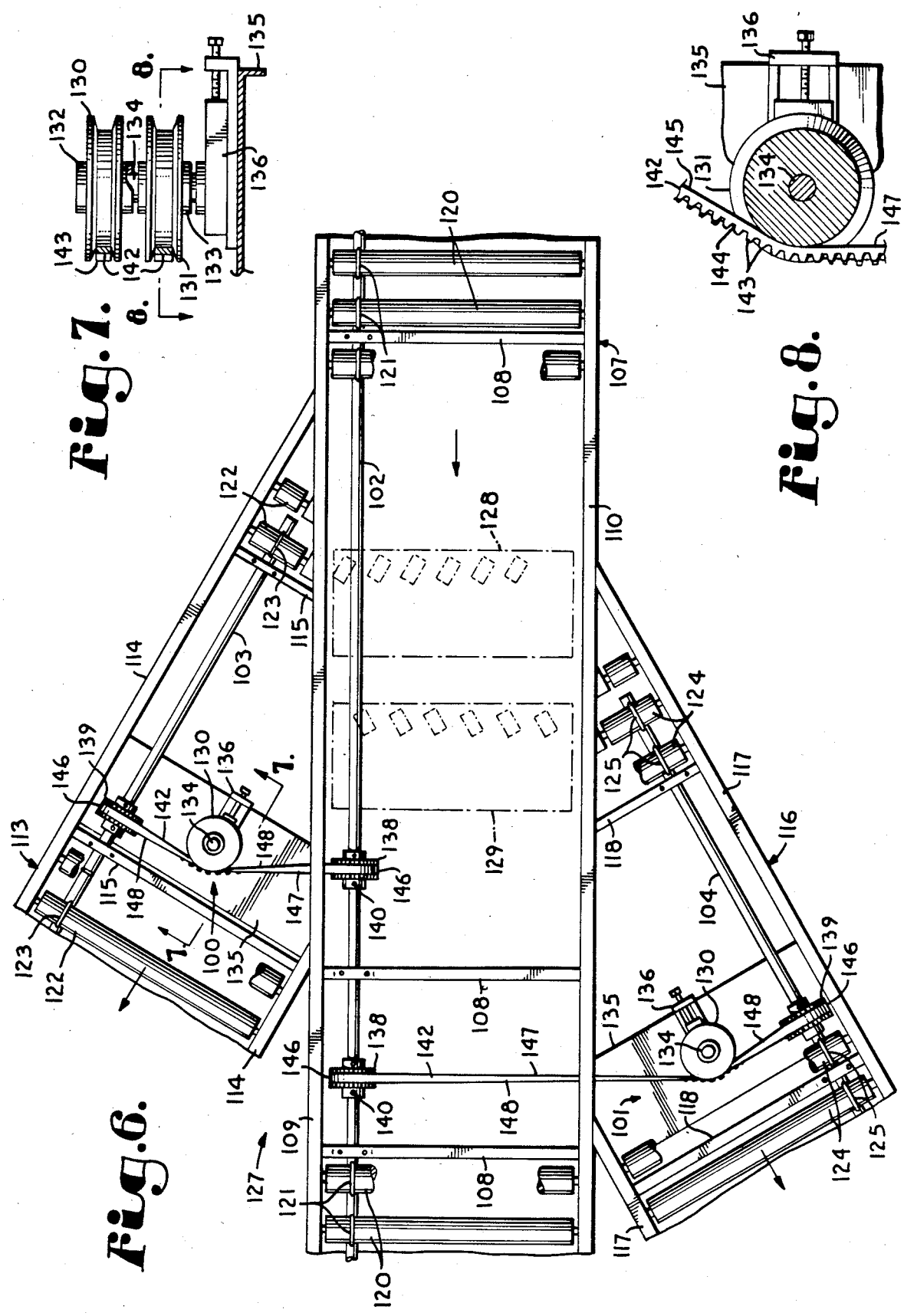

TWISTED FLAT BELT DRIVE FOR LINE SHAFT CONVEYORS

CROSS-REFERENCE TO RELATED APPLICATION

This is a continuation-in-part of copending application Ser. No. 769,421 for POP-UP DIVERTER FOR LINE SHAFT CONVEYORS filed Aug. 26, 1985 and now abandoned.

FIELD OF THE INVENTION

The present invention relates to drive mechanisms for conveyors and, more particularly, to a twisted flat belt drive for transferring rotation between shafts on conveyors such as from a main conveyor line shaft to a branch conveyor line shaft.

BACKGROUND OF THE INVENTION

It is sometimes necessary to transfer articles carried on a conveyor system from one conveyor line to another, as from a main line to a branch or spur line or vice versa. Often, it is convenient to power the conveyor elements in at least a transition section between branching conveyors from a single motor member, such as a motor member which drives the main conveyor line. Such arrangements occur in many types of conveyors, such as belt conveyors and roller conveyors, whether the rollers are driven by a belt, a cable, or by a line shaft.

In a line shaft driven roller conveyor, power is transmitted from a rotary motor to the conveyor rollers by an elongated drive shaft, usually termed a line shaft, which is rotatably supported along the main conveyor. Small endless belts, called O-rings, extend from the line shaft to each roller or to groups of rollers to transmit rotation thereto.

In the past when a line shaft driven branch conveyor is powered from a main conveyor line shaft, it is common to transfer power through a gear unit or through a universal joint arrangement, often in combination with an intermediate shaft driven by the main line shaft. These arrangements are relatively expensive, generally noisy, and often generate vibrations.

It is common to transfer rotation between shafts by the use of endless belts. When the shafts are parallel, belts of virtually any cross section may be employed, such as round, vee, or flat cross section belts. When it is desired to positively rotate the driven shaft at a selected fraction or multiple of the driving shaft speed, toothed belts of vee or flat (rectangular) cross section in combination with toothed pulleys or gears on the shafts are employed. When the shafts are not parallel, the belts must undergo twisting in transition between the shafts. In such situations, it is the usual practice to use round cross section belts since there are difficulties encountered in twisting vee and flat cross sectional belts and maintaining the belts on their pulleys. The usual alternative when positive drive is desired between nonparallel shafts is to use angled gear boxes or universal joints as mentioned above.

SUMMARY OF THE INVENTION

The present invention provides an arrangement for transferring rotation between nonparallel shafts by means of a flat cross section belt. A pair of idler rollers rotatable independently on a common idler shaft are positioned between the shafts. The belt forms end loops connected by opposite runs of the belt. The end loops engage the shafts or pulleys on the shafts, and middle portions of the runs engage the idlers. The runs of the belt twist upon approaching the idlers from each shaft. In a preferred embodiment of the invention, the belt has belt teeth on an inner surface and a smooth outer surface, and toothed pulleys or gears are keyed onto the shafts. The idler shaft and the gears are so positioned that the belt forms respective belt legs which approach each of the shafts perpendicularly. The runs of the belt are twisted in such a manner that the smooth outer surface of the belt contacts the idler rollers.

The present invention is advantageously applied to transfer rotation from a main line shaft to a branch line shaft of a branch conveyor which intersects the main conveyor at an acute angle. In order to conserve space and simplify the installation, the idler shaft is preferably cantilever supported, that is, connected to supporting structure at one end only. The idler rollers may be supported either on the main conveyor frame or the branch conveyor frame. In another embodiment of the present invention, the twisted flat belt arrangement transfers rotation from an intermediate transmission shaft to a perpendicularly oriented diverter shaft powering the rollers of a pop-up diverter mechanism. In both circumstances, the advantages of economy, simplicity, quietness, and reduced vibration are gained by the use of the present invention.

OBJECTS OF THE INVENTION

The principal objects of the present invention are: to provide a mechanism for transferring rotation from a first shaft to a nonparallel second shaft, particularly in a conveyor, from a main line shaft of a main roller conveyor to a branch line shaft of a conveyor line branching off the main conveyor; to provide a flat twisted belt mechanism for such rotation transfer including a gear on each shaft, an endless flat toothed belt engaging the gears, and a pair of smooth surfaced idler rollers positioned between the shafts and engaged by the belt to change the direction of the belt; to provide such a mechanism wherein the belt forms a pair of end loops engaging the gears and connected by belt runs which are twisted as they approach the idlers to engage the smooth outer surface of the belt with the idler rollers; to provide such a mechanism wherein the gears on the main line shaft and the branch line shaft are the same diameter to rotate at the same speed; to provide such a mechanism which operates quieter and with less vibration than other types of drive transfer mechanisms; to provide such a mechanism for transferring rotation from a conveyor shaft to a diverter drive shaft driving a plurality of rollers associated with a pop-up diverter arrangement; to provide such a mechanism for transferring rotation from an intermediate transmission shaft rotated by a conveyor line shaft to a diverter drive shaft; and to provide such a flat twisted belt drive mechanism which is economical to manufacture, durable and efficient in operation and which is particularly well adapted for its intended purpose.

Other objects and advantages of the present invention will become apparent from the following description taken in conjunction with the accompanying drawings wherein are set forth, by way of illustration and example, certain embodiments of this invention.

The drawings constitute a part of the specification, include an exemplary embodiment of the present invention, and illustrate various objects and features thereof.

BRIEF DESCRIPTION OF THE DRAWINGS

FIG. 3 is a fragmentary longitudinal sectional view of the diverter section with portions broken away to illustrate details of a diverter mechanism in a lowered nondivert position.

FIG. 4 is a view similar to FIG. 3 and illustrates the diverter mechanism in a raised divert position.

FIG. 5 is a transverse sectional view through the diverter section taken on line 5—5 of FIG. 2 and illustrates details of the drive transmission mechanism.

FIG. 6 is a fragmentary top plan view of a main conveyor and branch conveyors in which the twisted flat belt arrangement according to the present invention is employed to transfer rotation from a main line shaft to the branch line shafts.

FIG. 7 is an enlarged longitudinal sectional view taken on line 7—7 of FIG. 6 and illustrates details of a cantilever supported idler shaft and idler rollers thereon.

FIG. 8 is an enlarged fragmentary horizontal sectional view taken on line 8—8 of FIG. 7 and illustrates further details of one of the idler rollers.

DETAILED DESCRIPTION OF THE PREFERRED EMBODIMENT

Figure 1:
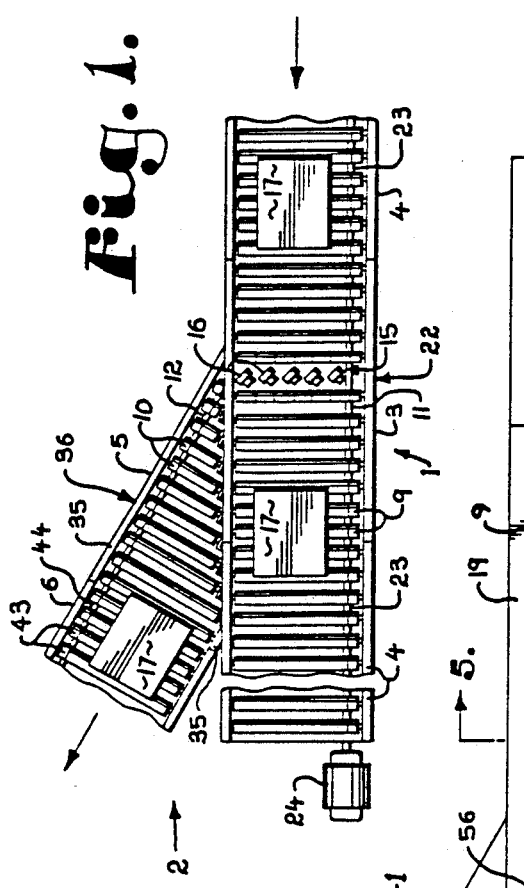
FIG. 1 is a fragmentary schematic top plan view at a reduced scale illustrating a conveyor system in which a twisted flat belt drive arrangement according to the present invention is installed.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a pop-up diverter arrangement installed in a roller conveyor system 2. The arrangement 1 includes a main conveyor section 3 in line with a main conveyor proper 4 and a branch conveyor section 5 in line with a branch conveyor proper 6 and intersecting the main section 3. The main conveyor section 3 includes a plurality of main rollers 9 journaled across and spaced along the main section 3, and the branch conveyor section 5 includes a plurality of branch rollers 10 journaled across and spaced along the branch section 5. A main line shaft 11 is rotatably supported along the main conveyor section 3, and a branch line shaft is rotatably supported along the branch conveyor section 5. The main rollers 9 are driven by rotation of the main line shaft 11. Similarly, the branch rollers 10 are driven by the branch line shaft 12.

A diverter mechanism 15 including a plurality of diverter rollers 16 is positioned on the main conveyor section 3. The diverter rollers 16 and the branch line shaft 12 are operatively interconnected with the main line shaft 11 and are rotated thereby. The diverter rollers 16 are selectively deployable above the level of the main rollers 9 to transfer an article 17 travelling along the main conveyor section 3 to the branch conveyor section 5.

The main conveyor section 3 includes a pair of laterally spaced main side rails 19 interconnected by lateral braces 20 which are spaced longitudinally along the side rails 19. The main section 3 may include a lower wall or plate 21 connected between the side rails 19. The side rails 19, braces 20, lower wall 21, and other components cooperate to form a rigid main conveyor section frame or main frame 22. The main rollers 9 are mounted across the main frame 22 and extend between the side rails 19. The main conveyor proper 4 may be constructed in a configuration similar to the main section 3 and preferably includes a system line shaft 23 having a conveyor system motor 24 coupled therewith and to which the main line shaft 11 is coupled. Alternatively, the main conveyor proper 4 could be a conveyor of a different configuration from the main section 3, such as a belt conveyor or belt driven roller conveyor, in which case the main line shaft 11 would be coupled with the system motor 24 in a different manner or would be independently powered. The main frame 22 may be supported above a floor as by main frame legs 25 connected to the main side rails 19.

In the illustrated conveyor system 2, the main line shaft 11 is mounted in main pillow blocks 26 which are positioned on the lateral braces 20. Rotary drive from the main line shaft 11 is transmitted to the main rollers 9 by endless belts or O-rings 27 which extend between each roller 9 and the main line shaft 11. Each of the rollers 9 may include a circumferential groove 28 to properly seat the associated O-ring 27 thereon. In the area of the diverter mechanism 15, gap rollers 29 immediately adjacent the diverter rollers 16 are spaced apart farther than the other main rollers 9 to form a gap 30 which provides clearance for the diverter rollers 16. The gap 30 is bridged for articles 17 which will not be diverted by gap O-rings 31 extending between the gap rollers 29 and which are preferably seated in grooves 32 spaced across the rollers 29.

The branch conveyor section 5 is preferably constructed similar to the main conveyor section 3 and includes branch side rails 35 joined in spaced apart relation to form a rigid branch conveyor section frame or branch frame. The branch conveyor section 5 may intersect the main section 3 at any convenient angle or at any angle required by the conveyor system 2. The illustrated branch section 5 diverges at an angle of approximately thirty degrees from the direction of travel on the main section 3. Because of the angle of divergence, the initial branch rollers 37 are of increasing length. In order to support these initial rollers 37, the branch section 5 is provided with a head rail 38 (FIG. 2) which extends between the branch side rails 35. The branch frame 36 is supported above a floor as by branch frame legs (not shown). The branch line shaft 12 is supported on the branch frame 36 in a manner similar to the main line shaft 11 on the main frame 22. Rotation is transmitted from the branch line shaft 12 to the branch rollers 37 and 10 by branch O-rings 40.

The branch conveyor proper 6 may be any type of conveyor and is illustrated as a roller conveyor on which the branch system rollers 43 are driven by a branch system line shaft 44 (FIG. 1). The branch line shaft 12 may be coupled to the branch system shaft 44, or the shaft 44 may be powered independently from the branch line shaft 12 as the requirements of the conveyor system 2 dictate.

Figure 2:
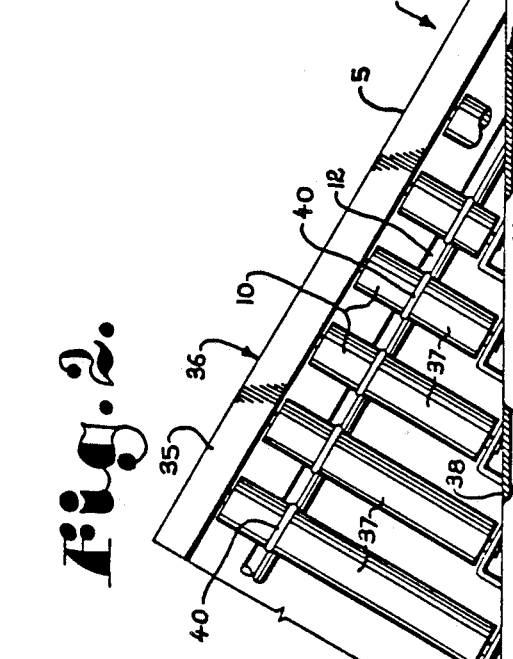
FIG. 2 is an enlarged fragmentary plan view of a diverter section of the conveyor system with portions broken away to illustrate details of the drive transmission mechanisms.

Referring to FIGS. 2 and 5, the diverter arrangement 1 includes a transmission mechanism 47 for transmitting rotation from the main line shaft 11 to the branch line shaft 12 and to the diverter rollers 16. A transmission shaft 48 is rotatably supported on the main frame 22 by means of transmission shaft pillow blocks 49 positioned on one of the lateral braces 20 and on a brace stub 50 extending from one of the main side rails 19. A drive pulley 51 is keyed to the main line shaft 11, and similarly a driven pulley 52 is keyed to the transmission shaft 48 in alignment with the pulley 51. An endless transmission belt 53 is trained about the pulleys 51 and 52 and thereby transfers rotation from the mainline shaft 11 to the transmission shaft 48. Preferably, the pulleys 51 and 52 and the transmission belt 53 are toothed for more positive transmission of rotation therebetween. The transmission shaft 48 is interconnected with the branch line shaft 12 by a universal joint 54 or, for smoother rotation, by an intermediate shaft 55 with universal joints 54 at each end connected respectively to the transmission shaft 48 and the branch line shaft 12. A cutout 56 (FIG. 4) is formed in one of the side rails 19 for the shaft 12 to extend through. A similar cuttout (not shown) is formed in the head rail 38.

The diverter mechanism 15 includes a diverter support shelf 58 which extends across and connects between the main side rails 19. A diverter drive shaft 59 is rotatably supported on the shelf 58 by a pair of diverter shaft pillow blocks 60. A plurality of diverter O-ring sheaves 61, one for each diverter roller 16, are spaced along the diverter shaft 59. A stretchable diverter O-ring 62 extends between each sheave 61 and its associated diverter roller 16.

The diverter rollers 16 are rotatably mounted on a diverter support frame 65 which is pivotally supported on the main frame 22. The illustrated diverter frame 65 includes a pivot tube 66 which is sleeved onto a diverter pivot rod 67. The ends of the rod 67 are threaded and extend through the main side rails 19 and fastened as by nuts 68. A pair of tubular arms 69 extend from the pivot tube 66 and connect with an end tube 70. A roller support plate 71 is positioned on the ends of the arms 69 and the end tube 70. A diverter actuation motor 72 is connected between the plate 71 and the shelf 58 and controls the vertical position of the diverter rollers 16. The motor 72 is preferably a flat type of pneumatic cylinder which has an operation stroke of about one half inch. The motor 72 is connected to a source of compressed air (not shown) by way of a valve (not shown). The diverter rollers 16 are illustrated in a lower nondivert position in FIG. 3 and in a raised divert position in FIG. 4.

The diverter rollers 16 are mounted on L-brackets 74 which are positioned in spaced relation across the free end 75 of the diverter support plate 71. Preferably, cutouts 76 are formed across the free end 75 for clearance of the diverter O-rings 62. The brackets 74 are positioned to orient the diverter rollers 16 at an angle which will properly urge articles 17 onto the branch section 5. In the illustrated arrangement 1, the diverter rollers 16 are oriented at about forty-five degrees from the line of travel on the main section 3. The angular disposition of the diverter rollers 16 exceeds that of the branch section 5 in order to compensate for the initial momentum of the articles 17 being diverted.

Rotation is transferred to the diverter rollers 16 from the main line shaft 11 by way of the transmission mechanism 47. A diverter drive pulley or gear 79 is keyed to the transmission shaft 48, and a diverter shaft pulley or gear 80 is keyed to the diverter shaft 59. A flat endless diverter transmission belt 81 is trained around the pulleys 79 and 80. Since the transmission 48 and the diverter shaft 59 are at right angles to one another, a direction changing device is required. In the illustrated arrangement 1, an idler shelf 84 extends between the main side rails 19 and has an idler shaft 85 projecting upwardly therefrom. An upper idler pulley 86 and a lower idler pulley 87 are rotatably received on the shaft 85 for mutually independent rotation thereon. An upper run of the diverter transmission belt 81 engages the upper idler 86, and a lower run of the belt engages the lower idler 87. The pulleys 79 and 80 and the belt 81 are preferably toothed while the idler pulleys 86 and 87 are smooth. Therefore, the diverter transmission belt 81 is twisted in such a manner as to engage an inner toothed surface 82 with the pulleys 79 and 80 and to engage a smooth outer surface 83 with the idler pulleys 86 and 87. The belt 81, pulleys 79 and 80, and idlers 86 and 87 form an embodiment of a twisted flat belt drive 88 according to the present invention.

The system motor 24 rotates the main line shaft 11 through the system line shaft 23. Rotation is transferred from the main line shaft 11 to the transmission shaft 48 through the transmission belt 53 and to the main section rollers 9 through the main O-rings 27. The branch line shaft 12 is connected to the transmission shaft 48 by the intermediate shaft 55 and universal joints 54 and rotates the branch section rollers 10 by way of the branch O-rings 40. Rotation is transmitted to the diverter rollers 16 from the transmission shaft 48 by the diverter transmission belt 81 through the diverter shaft 59 and the diverter O-rings 62. If an article 17 travelling along the main section 3 is to be diverted to the branch section 5, the diverter actuation cylinder 72 is extended to raise the diverter rollers 16 above the level of the main rollers 9. By this means, the article 17 is driven toward and transferred onto the branch rollers 10 and from there onto the branch conveyor proper 6. Otherwise, the diverter rollers 16 remain below the level of the main rollers 9 and do not engage the article 17 which continues on its way toward the main conveyor proper 4.

FIG. 6 illustrates embodiments 100 and 101 of the twisted belt drive applied to transfer rotation from a main conveyor line shaft 102 to branch conveyor line shafts 103 and 104. The main line shaft 102 is mounted longitudinally along a main conveyor frame 107 by attachment to cross braces 108 spaced along the frame 107 through pillow blocks (not shown) similar to the pillow blocks 26 of the main conveyor 3. The main conveyor frame 107 is formed by right and left main conveyor side rails respectively 109 and 110 interconnected by the braces 108. Similarly, a right branch conveyor frame 113 is formed by side rails 114 interconnected by braces 115, and a left branch conveyor frame 116 is formed by side rails 117 interconnected by braces 118. The right branch line shaft 103 is mounted by pillow blocks (not shown) attached to the right braces 115, and the left branch line shaft 104 is mounted by pillow blocks (not shown) attached to the left braces 118.

The main conveyor frame 107 has main conveyor rollers 120 journaled therealong to carry articles thereon. The rollers 120 (most of which have been removed in FIG. 6 for clarity) are connected by O-rings 121 to the main line shaft 102. Similarly, the right branch conveyor frame 113 has right branch rollers 122 connected to the right branch line shaft 103 by right branch O-rings 123, and the left branch conveyor frame 116 has left branch rollers 124 connected by left branch O-rings 125 to the left branch line shaft 104. The main conveyor frame 107 and branch frames 113 and 116 form a conveyor spur section 127 which is preferably an interconnected unitary structure. If articles originate on the main conveyor and are to be diverted to one of the right or left branches, the main conveyor frame 107 includes a right diverter mechanism 128 for diverting articles onto the right branch rollers 122 and a left diverter mechanism 129 for diverting articles onto the left branch rollers 124. The diverter mechanisms 128 and 129 are shown in phantom in FIG. 6 and may be substantially similar to the diverter mechanism 1 described above or may be any other suitable diverter mechanism. If articles originate on the branch conveyors and are transferred onto the main conveyor in the spur section 127, no diverter mechanism may be needed.

The twisted flat belt drive assemblies 100 and 101 are substantially similar. Therefore, only one of the drive assemblies, such as the right drive assembly 100, will be described in detail while the same reference numerals will be used for corresponding parts in both the right and left drive assemblies 100 and 101.

The twisted belt drive assembly 100 includes a pair of idler rollers 130 and 131 mounted by independent bearing structures 132 and 133 on a cantilever supported idler shaft 134. The idler shaft 134 is mounted on an idler shelf 135 extending across the associated branch conveyor frame 113 or 116. In the illustrated embodiments 100 and 101, the shafts 102, 103, and 104 are in a common plane; and the idler shaft 134 is oriented perpendicular to the plane of the shafts. Preferably, the position of the idler shaft 135 is adjustable for belt tension adjustment, and a screw adjustable slide mechanism 136 is provided for this purpose.

The main line shaft 102 has drive toothed pulleys or gears 138 affixed thereon, and the right and left branch line shafts 103 and 104 have driven gears 139 affixed thereon. The positions of the gears 138 and 139 are preferably adjustable along their respective shafts such as by means of set screws 140 in the collars of the gears.

Drive transfer belts 142 are trained about the sets of gears 138 and 139 and passed about the idler rollers 130 and 131 to change the directions of the belts. As shown particularly in FIG. 8, the belt 142 has belt teeth 143 on an inner surface 144 thereof and a smooth outer surface 145. Each endless belt 142 forms end loops 146 connected by opposite runs 147. The end loops 146 engage the gears 138 and 139 while the runs 147 engage the idler rollers 130 and 131. The runs 147 of the belts 142 are twisted as they approach the idler rollers 130 and 131 such that the belt teeth 143 mesh with teeth on the gears 138 and 139 while the smooth outer surfaces 145 contact the smooth surfaces of the idler rollers. The belts 142 are divided into belt legs 148. The positions of the gears 138 and 139 and the idler shaft 134 for each belt 142 are adjusted such that the belt legs 148 approach their respective shafts perpendicularly. If it is desirable for the branch line shafts 103 and/or 104 to rotate at the same speed as the main line shaft 102, driven gears 139 are selected which have the same outer diameter as the drive gears 138.

As illustrated in FIG. 7, the belts 142 have a flat or rectangular cross section, exclusive of the teeth 143 thereon. A flattened cross section is preferred to other shapes such as vee cross sections because the contrast of width to thickness of a flat cross section belt has a greater resistance to rotation about a belt longitudinal axis for a given tension in a twisting installation than the more regular cross sectional shape of vee belts. Thus, flat cross section belts have less of a tendency to work their way off the gears about which they are trained.

In operation, the twisted belt drive assemblies 100 and 101 perform in substantially the same manner as the assembly 88 described above. The assemblies 100 and 101 may also be combined with assemblies 88 to transfer rotation from a main line shaft to the rollers of a diverter mechanism and to a branch line shaft driving the rollers of a branch conveyor. It should be noted that in some arrangements, it might be more convenient to mount the idler shaft 134 and idler rollers on the main conveyor frame 107 rather than on one of the branch conveyor frames. While the drive belts 142 have been described and illustrated as being toothed and the pulleys 138 and 139 as being gears, there is no essential requirement that they be so. However, toothed engagement between the belts 142 and gears 138 and 139 is preferred for positive drive transfer.

It is to be understood that while certain forms of the present invention have been described and illustrated herein, it is not to be limited to the specific forms or arrangement of parts described and shown.

What is claimed and desired to be secured by Letters Patent is as follows:

1. A twisted flat belt drive mechanism to transfer rotation from one shaft to another shaft, said mechanism comprising:
   (a) a first shaft supported to rotate about a first shaft axis of rotation;
   (b) a second shaft supported to rotate about a second shaft axis of rotation, said second shaft being oriented nonparallel to said first shaft;
   (c) motor means drivingly connected to said first shaft to rotate same;
   (d) a pair of idler rollers supported generally between said first and second shafts to rotate about a common idler axis of rotation; and
   (e) an endless flat belt forming opposite end loops connected by opposite runs of said belt, said end loops drivingly engaging said first and second shafts respectively to transfer rotation from said first shaft to said second shaft, and said runs of said belt engaging respective ones of said idler rollers intermediate said end loops to change the direction of said belt in passing from said first shaft to said second shaft; and wherein
   (f) said flat belt has an inner surface and an opposite outer surface; and
   (g) said runs of said belt are twisted as said runs approach said idler rollers such that only said outer surface engages both of said idler rollers.

2. A mechanism as set forth in claim 1 wherein:
   (a) said first and second shaft axes of rotation are in a common plane; and
   (b) said idler axis of rotation is substantially perpendicular to said common plane.

3. A roller conveyor system comprising:
   (a) a main conveyor frame;
   (b) a branch conveyor frame intersecting said main conveyor frame;

(c) a main line shaft extending along said main conveyor frame and drivingly connected to a plurality of main conveyor rollers journaled along said main conveyor frame to rotate said main conveyor rollers; said main line shaft rotating about a first axis of rotation;

(d) a branch line shaft extending along said branch conveyor frame and drivingly connected to a plurality of branch conveyor rollers journaled along said branch conveyor frame to rotate said branch conveyor rollers; said branch shaft supported to rotate about a second shaft axis of rotation; said branch shaft being oriented nonparallel to said main line shaft;

(e) motor means drivingly connected to said main line shaft to rotate same;

(f) a pair of idler rollers supported by one of said main and branch shaft frames; generally between said main line and branch line shafts so as to rotate about a common idler axis of rotation;

(g) an endless flat belt forming opposite end loops connected by opposite runs of said belt, said end loops drivingly engaging said main line and branch line shafts respectively to transfer rotation from said main line shaft to said branch line shaft, and said runs of said belt engaging respective ones of said idler rollers intermediate said end loops to change the direction of said belt in passing from said main line shaft to said branch line shaft; and wherein:

(h) said flat belt has an inner surface and an opposite outer surface; and (i) said runs of said belt are twisted as said runs approach said idler rollers such that only said outer surfaces engages both of said idler rollers.

4. A mechanism as set forth in claim 1 including:
(a) a first gear affixed to said first shaft and having gear teeth on a cylindrical surface of said first gear;
(b) a second gear affixed to said second shaft and having gear teeth on a cylindrical surface of said second gear;
(c) said flat belt having an inner surface and an opposite outer surface and having belt teeth formed on said inner surface; and
(d) said belt engaging said first and second gears such that the belt teeth of said belt mesh with the gear teeth of said first and second gears.

5. A mechanism as set forth in claim 4 wherein:
(a) said first gear and said second gear have the same diameter such that said second shaft rotates at the same angular speed as said first shaft.

6. A mechanism as set forth in claim 1 wherein:
(a) said idler rollers are positioned and oriented such that said belt forms a first belt leg and a second belt leg which are perpendicular respectively to said first and second shafts.

7. A twisted flat belt drive mechanism in combination with a roller conveyor system including a main conveyor frame, a branch conveyor frame, a main line shaft and a branch line shaft to transfer rotation from said main line shaft to said branch line shaft aligned to be non-parallel to said main line shaft, said mechanism wherein:
(a) said main line shaft is elongated and rotatably supported along said main conveyor frame to rotate about a main shaft axis of rotation and drivingly connected to plurality of main conveyor rollers journaled along said main conveyor frame to rotate said main rollers; and including:
(b) a main gear affixed to said main shaft and having gear teeth on a cylindrical surface of said main gear; and wherein:
(c) said branch line shaft is elongated and rotatably supported along said branch conveyor frame intersecting said main conveyor frame to rotate about a branch shaft axis of rotation and drivingly connected to a plurality of branch rollers journalled along said branch conveyor frame to rotate said branch rollers, said branch shaft being oriented nonparallel to said main shaft; and further including:
(d) a branch gear affixed to said branch shaft and having gear teeth on a cylindrical surface of said branch gear;
(e) motor means drivingly connected to said main shaft to rotate same;
(f) a pair of idler rollers supported by one of said main and branch conveyor frames generally between said main and branch shafts to rotate about an idler axis of rotation;
(g) an endless flat belt having an inner surface and an opposite outer surface and having gear teeth formed on said inner surface, said belt forming opposite end loops connected by opposite runs of said belt;
(h) said end loops of said belt engaging said main and branch gears such that the teeth on said belt mesh with the teeth on said gears to transfer rotation from said main shaft to said branch shaft;
(i) said runs of said belt engaging respective ones of said idler rollers intermediate said end loops to change the direction of said belt in passing from said main shaft to said branch shaft; and
(j) said runs of said belts being twisted as said runs approach said idler rollers such that said outer surface of said belt engages both of said idler rollers.

8. A mechanism as set forth in claim 7, wherein:
(a) said main and branch shaft axes of rotation are in a common plane; and
(b) said idler axis of rotation is substantially perpendicular to said common plane.

9. A mechanism as set forth in claim 7 wherein:
(a) said main gear and said branch gear have the same diameter such that said branch shaft rotates at the same angular speed as said main shaft.

10. A mechanism as set forth in claim 7 wherein:
(a) said idler rollers are positioned and oriented such that said belt forms a main belt leg and a branch belt leg which are perpendicular respectively to said main and branch shafts.

11. A mechanism as set forth in claim 7 including:
(a) an idler roller shaft cantilever supported on one of said main and branch conveyor frames; and
(b) said idler rollers being journaled on said idler roller shaft to rotate independently thereabout.

12. A diverter drive arrangement to transfer rotation from a shaft on a conveyor frame to a roller of a diverter mechanism, said arrangement comprising:
(a) a diverter mechanism supported on a main conveyor frame, including a diverter roller, and being selectively actuated to deploy said diverter roller in such a manner as to engage an article traveling on a main conveyor and transfer same to a branch conveyor;

(b) a diverter roller drive shaft rotatably supported across said main conveyor frame and drivingly engaging said diverter roller to rotate same upon the rotation of said diverter shaft;

(c) main conveyor motor means including a motor means member rotating about a motor means axis nonparallel to said diverter shaft;

(d) a pair of idler rollers supported on said main conveyor frame generally between said motor means member and said diverter shaft to rotate about a common idler axis;

(e) an endless, flat diverter roller drive belt forming opposite end loops connected by opposite runs of said belt, said end loops drivingly engaging said motor means member and said diverter shaft respectively to transfer rotation from said motor means member to said diverter shaft, and said runs of said belt engaging respective ones of said idler rollers intermediate said end loops to change the direction of said belt in passing from said motor means member to said diverter shaft; and wherein (f) said runs of said belt are twisted as said runs approach said idler rollers such that said outer surface of said belt engages both of said idler rollers.

13. A system as set forth in claim 12 wherein said main conveyor motor means includes:
(a) an elongated main line shaft rotatably supported along said main conveyor frame;
(b) a transmission shaft rotatably supported on said main conveyor frame nonparallel to said diverter drive shaft;
(c) a transmission belt drivingly engaged between said main line shaft and said transmission shaft to transfer rotation from said main line shaft to said transmission shaft; and
(d) said diverter belt engaged between said transmission shaft and said diverter shaft to transfer rotation from said transmission shaft to said diverter shaft.

14. A diverter drive arrangement to transfer rotation from a shaft on a conveyor frame to a roller of a diverter mechanism, said arrangement comprising:
(a) a diverter mechanism supported on a main conveyor frame, including a diverter roller, and being selectively actuated to deploy said diverter roller in such a manner as to engage an article traveling on a main conveyor and transfer same to a branch conveyor;
(b) a diverter roller drive shaft rotatably supported across said main conveyor frame and drivingly engaging said diverter roller to rotate same upon the rotation of said diverter shaft;
(c) main conveyor motor means including a motor means member rotating about a motor means axis nonparallel to said diverter shaft;
(d) an idler roller shaft cantilever supported on said main conveyor frame and positioned generally between said motor means member and said diverter shaft;
(e) a pair of idler rollers supported on said idler roller shaft to rotate independently on said idler roller shaft about a common axis of rotation;
(f) an endless diverter roller drive belt forming opposite end loops connected by opposite runs of said belt, said end loops drivingly engaging said motor means member and said diverter shaft respectively to transfer rotation from said motor means member to said diverter shaft, and said runs of belt engaging respective ones of said idler rollers intermediate said end loops to change the direction of said belt in passing from said motor means member to said diverter shaft; and wherein:
(g) said runs of said belt being twisted as said runs approach said idler rollers such that said outer surface of said belt engages both of said idler rollers.

15. An arrangement as set forth in claim 14 wherein:
(a) said diverter roller drive belt has a flat cross section.

16. An arrangement as set forth in claim 14 including:
(a) a motor means gear affixed to said motor means member and having gear teeth on a cylindrical surface of said motor means gear;
(b) a diverter gear affixed to said diverter shaft and having gear teeth on a cylindrical surface of said diverter gear;
(c) said diverter belt having a flat cross section, an inner surface, an opposite outer surface, and belt teeth formed on said inner surface;
(d) said belt engaging said motor means gear and said diverter gear such that said belt teeth mesh with said gear teeth of said motor means gear and said diverter gear.

17. A conveyor system comprising:
(a) an elongated main conveyor including a main conveyor frame and a main conveyor element positioned on said main conveyor frame to move articles along said main conveyor;
(b) main conveyor motor means including a motor means member rotating about a motor means axis and operatively engaged with said main conveyor element to cause the movement of articles thereby;
(c) an elongated branch conveyor intersecting said main conveyor;
(d) a diverter mechanism supported on said main conveyor frame, including at least one diverter roller rotatably supported on said diverter mechanism, and being selectively actuated to deploy said diverter roller in such a manner as to engage an article traveling on said main conveyor and transfer same to said branch conveyor; and
(e) diverter roller drive means including:
(1) a diverter roller drive shaft rotatably supported across said main conveyor frame nonparallel to said motor means axis and drivingly engaging said diverter roller to rotate same upon the rotation of said diverter shaft;
(2) a pair of idler rollers supported on said main conveyor frame generally between said motor means member and said diverter shaft to rotate about a common idler axis;
(3) an endless, flat diverter roller drive belt forming opposite end loops connected by opposite runs of said belt, said end loops drivingly engaging said motor means member and said diverter shaft respectively to transfer rotation from said motor means member to said diverter shaft, and said runs of said belt engaging respective ones of said idler rollers intermediate said end loops to change the direction of said belt in passing from said motor means member to said diverter shaft and wherein:
(4) said runs of said belt being twisted as said runs approach said idler rollers such that said outer surface of said belt engages both of said idler rollers.

18. A system as set forth in claim 17 including:

(a) a motor means gear affixed to said motor means member and having gear teeth on a cylindrical surface of said motor means gear;
(b) a diverter gear affixed to said diverter shaft and having gear teeth on a cylindrical surface of said diverter gear;
(c) said diverter belt having an inner surface and an opposite outer surface and having belt teeth formed on said inner surface;
(d) said belt engaging said motor means gear and said diverter gear such that said belt teeth mesh with said gear teeth of said motor means gear and said diverter gear.

19. A system as set forth in claim 17 wherein said main conveyor motor means includes:
(a) an elongated main line shaft rotatably supported along said main conveyor frame;
(b) a transmission shaft rotatably supported along said main conveyor frame nonparallel to said diverter shaft;
(c) a transmission belt drivingly engaged between said main line shaft and said transmission shaft to transfer rotation from said main line shaft to said transmission shaft; and
(d) said diverter belt being engaged between said transmission shaft and said diverter shaft to transfer rotation from said transmission shaft to said diverter shaft.

20. A system as set forth in claim 17 wherein:
(a) said branch conveyor is a branch roller conveyor including a plurality of branch conveyor rollers journaled across and spaced along said branch conveyor;
(b) said branch conveyor includes a branch line shaft rotatably supported along said branch conveyor and operatively connected with said branch rollers to rotate same; and
(c) branch transmission means drivingly connect between said main line shaft and said branch line shaft to rotate said branch line shaft upon the rotation of said main line shaft.

21. A system as set forth in claim 20 wherein said branch transmission means includes:
(a) a transmission shaft rotatably supported along said main frame;
(b) universal joint means drivingly interconnecting said transmission shaft with said branch line shaft; and
(c) a transmission belt drivingly interconnecting said transmission shaft with said main line shaft.

22. A system as set forth in claim 17 wherein:
(a) said branch conveyor is a branch roller conveyor and said branch conveyor element is a plurality of branch conveyor rollers journaled across and spaced along said branch conveyor;
(b) said branch conveyor includes a branch line shaft rotatably supported along said branch conveyor and operatively connected with said branch rollers to rotate same;
(c) a transmission shaft is rotatably supported along said main frame;
(d) universal joint means drivingly interconnects said transmission shaft with said branch line shaft;
(e) an endless transmission belt drivingly interconnects said transmission shaft with said main line shaft; and
(f) said diverter roller drive belt is operatively engaged between said transmission shaft and said diverter shaft.

23. A system as set forth in claim 17 including:
(a) an endless diverter O-ring drivingly engaged between said diverter roller drive shaft and said diverter roller.

24. A system as set forth in claim 17 wherein:
(a) said diverter mechanism includes a plurality of diverter rollers supported in spaced apart relation across said main conveyor frame; and
(b) said diverter roller drive shaft is operatively engaged with each of said diverter rollers.

25. A system as set forth in claim 17 wherein:
(a) said main conveyor motor means includes a transmission shaft supported on said main conveyor frame longitudinal to said main conveyor frame;
(b) said diverter shaft is substantially perpendicular to said transmission shaft; and
(c) said diverter belt extends from said transmission shaft around said idler rollers to said diverter shaft.

26. A system as set forth in claim 25 wherein:
(a) said main conveyor element includes a plurality of main conveyor rollers journaled across and spaced along said main conveyor frame;
(b) said main conveyor motor means includes a main line shaft rotatably supported along said main conveyor frame, having a rotary motor operatively connected thereto, and being operatively connected to said main conveyor rollers to rotate same; and
(c) an endless transmission belt is drivingly engaged between said main line shaft and said transmission shaft.

* * * * *